US012749815B2

(12) United States Patent
Ayotte et al.

(10) Patent No.: US 12,749,815 B2
(45) Date of Patent: Sep. 29, 2026

(54) COMBINED AIR WAVEGUIDE ANTENNA AND HOUSING

(71) Applicant: Aptiv Technologies AG, Schaffhausen (CH)

(72) Inventors: Kenneth Ayotte, Indianapolis, IN (US); Yuxiao He, Carmel, IN (US); Ryan Rossiter, Kokomo, IN (US)

(73) Assignee: Aptiv Technologies AG, Schaffhausen (CH)

( * ) Notice: Subject to any disclaimer, the term of this patent is extended or adjusted under 35 U.S.C. 154(b) by 207 days.

(21) Appl. No.: 18/650,554

(22) Filed: Apr. 30, 2024

(65) Prior Publication Data

US 2025/0337168 A1 Oct. 30, 2025

(51) Int. Cl.
*H01Q 1/32* (2006.01)
*H01Q 1/52* (2006.01)
*H01Q 13/06* (2006.01)
*H01Q 1/27* (2006.01)

(52) U.S. Cl.
CPC ............... *H01Q 13/06* (2013.01); *H01Q 1/27* (2013.01)

(58) Field of Classification Search
CPC .. H01Q 1/00; H01Q 1/27; H01Q 1/32; H01Q 1/52; H01Q 13/06; H01Q 21/00
See application file for complete search history.

(56) References Cited

U.S. PATENT DOCUMENTS 7,109,938 B2 * 9/2006 Franson .................. G01S 7/032 343/840
11,011,847 B2 * 5/2021 Samardzija .............. H01Q 9/30
11,177,566 B2 * 11/2021 Wu .......................... H01Q 1/38
11,450,962 B1 * 9/2022 Gustafson .......... H01Q 21/0025
11,978,960 B2 * 5/2024 Hamminga ............ H01Q 13/22
12,055,654 B2 * 8/2024 Mann ................... H05K 1/0218
2023/0025442 A1 1/2023 Baur
2023/0059342 A1 2/2023 Mann

FOREIGN PATENT DOCUMENTS

WO 2024056502 A1 3/2024

OTHER PUBLICATIONS

Extended European Search Report for EP24187245.6 dated Apr. 28, 2025, 11 pages.
Partial European Search Report for EP24187245.6 dated Feb. 5, 2025, 14 pages.

(Continued)

*Primary Examiner* — Tho G Phan
(74) *Attorney, Agent, or Firm* — Miller Johnson

(57) ABSTRACT

A waveguide antenna assembly includes a lower housing, an upper housing, and a printed circuit board (PCB). The lower housing is formed, at least in part, from a conductive material. The upper housing is coupled to the lower housing and is formed, at least in part, from a conductive material. The upper housing and the lower housing define a slot. The printed circuit board (PCB) is disposed within the slot and includes a first side and a second side. The first side faces the lower housing and includes a first plurality of components arranged in a first circuit. The second side faces the upper housing and includes a second plurality of components arranged in a second circuit.

17 Claims, 8 Drawing Sheets

(56) References Cited

OTHER PUBLICATIONS

Kaneda et al., "A Broad-Band Microstrip-to-Waveguide Transition Using Quasi-Yagi Antenna," in IEEE Transactions on Microwave Theory and Techniques, vol. 47, No. 12, pp. 2562-2567, Dec. 1999.
Xu et al., "A Rectangular Waveguide-Microstrip Transition Based on the Principle of Magnetic Coupling for Millimeter-wave" 2009 International Conference on Microwave Technology and Computational Electromagnetics, 3 pages, 2009.
Zhang et al., "A waveguide to Microstrip Inline Transition With Very Simple Modular Assembly," in IEEE Microwave and Wireless Componenents Letters, vol. 20, No. 9, pp. 480-482, Sep. 2010.
Lou et al., "An In-Line Waveguide-to-Microstrip Transition Using Radial-Shaped Probe," in IEEE Microwave and Wireless Componenents Letters, vol. 18 No. 5, pp. 311-313, May 2008.
Zarba et al., "An optimized waveguide to microstrip transition at K band," in 26th EuMC, pp. 836-838, 1996.
Li et al., "Full W-Band Waveguide-to-Microstrip Transition With New E-Plane Probe," in IEEE Microwave and Wireless Componenents Letters, vol. 23, No. 1, pp. 4-6, Jan. 2013.
Xu et al., "Novel In-Line Microstrip-to-Waveguide Transition Based on E-Plane Probe T-Junction Structure," in IEEE Microwave and Wireless Componenents Letters, vol. 31, No. 9, pp. 1051-1054, Sep. 2021.

* cited by examiner

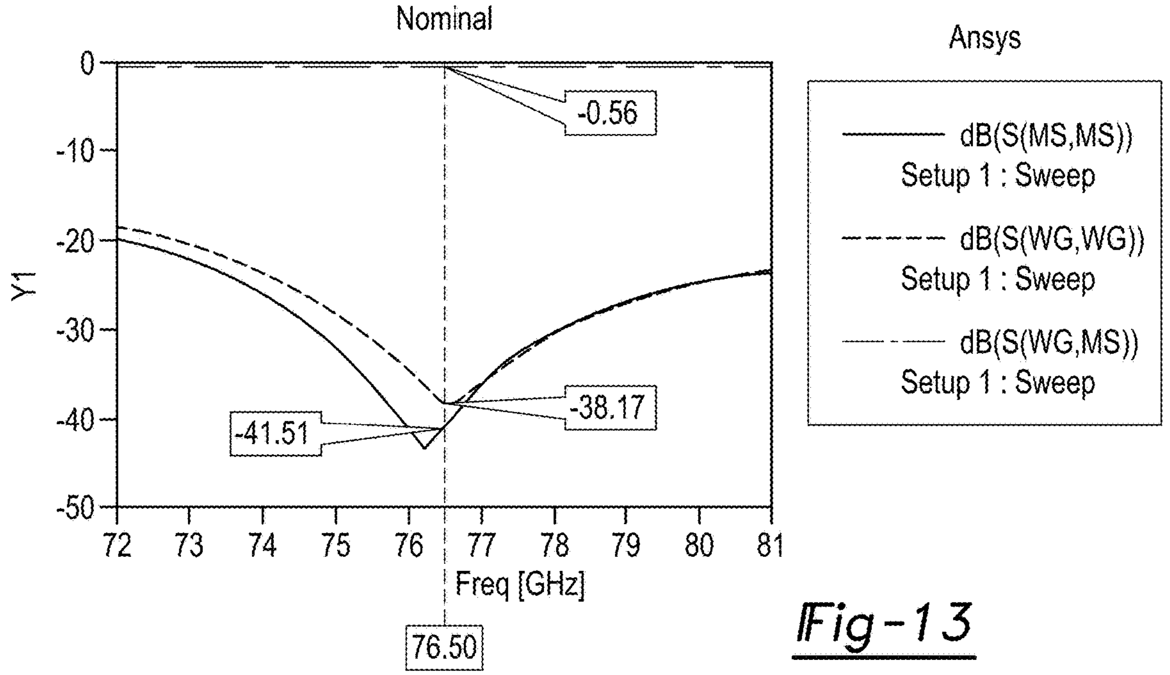
Fig-13
Fig-14
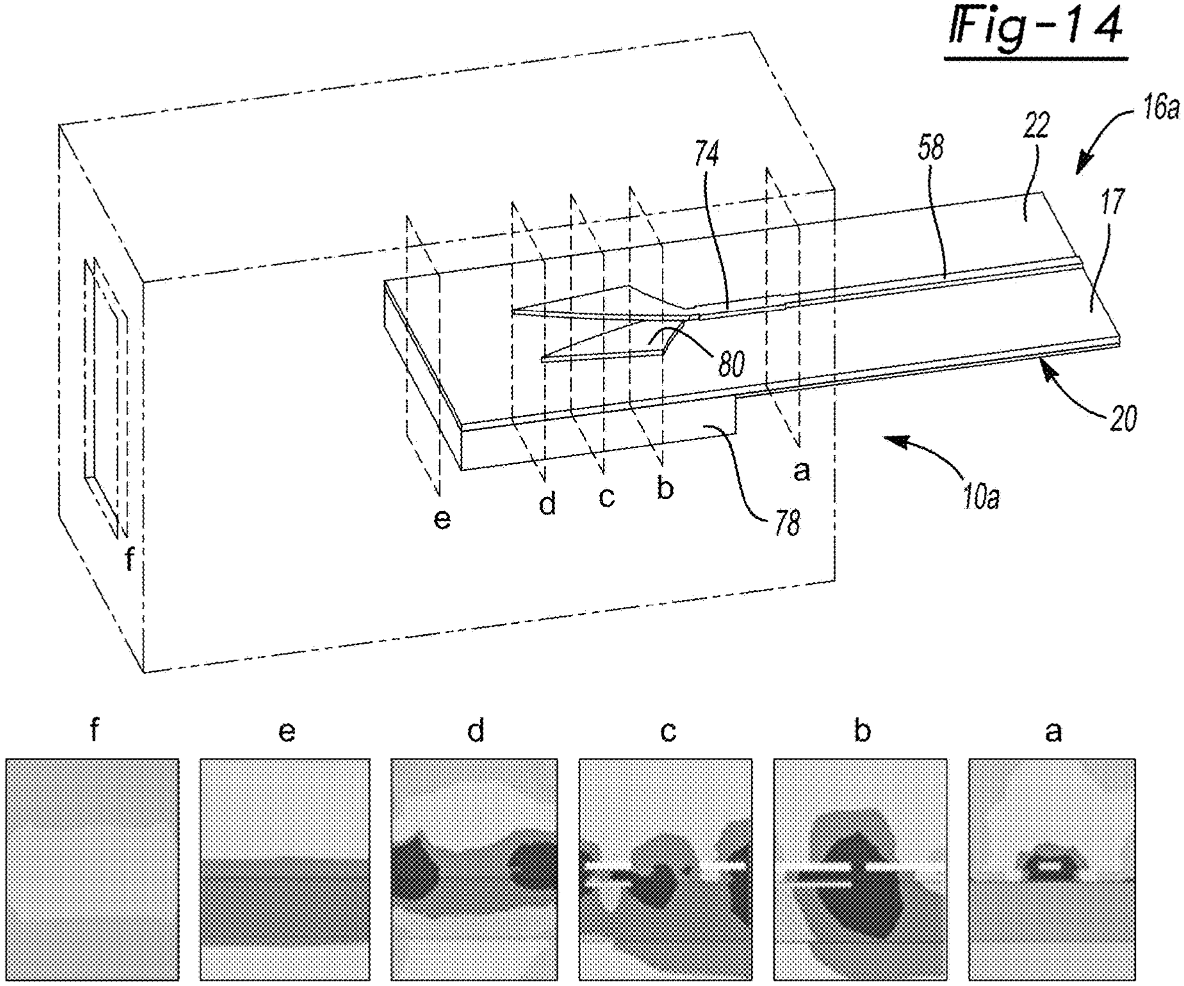

COMBINED AIR WAVEGUIDE ANTENNA AND HOUSING

FIELD

The present disclosure relates to a waveguide antenna and housing, and more particularly to a combined multi-piece air waveguide antenna and housing.

BACKGROUND

Waveguide antennas are widely used in various applications including automotive, telecommunications, radar systems, satellite communication, and wireless networks to transmit and receive electromagnetic signals with minimal loss and distortion. The waveguide antenna radiates an electromagnetic wave, (e.g., of a millimeter band) in a desired direction and receives a reflected wave from objects in front of the radar to detect possible objects. A radar system may comprise an air waveguide antenna and a printed circuit board (PCB). Conventional waveguide antennas typically consist of metallic waveguides enclosed within a protective housing. The installation of waveguide antennas can be complex and time-consuming, requiring precise alignment and calibration. While known waveguide antennas have proven acceptable for their intended purposes, a continuous need for improvement in the relevant art remains.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure

SUMMARY

This section provides a general summary of the disclosure, and is not a comprehensive disclosure of its full scope or all of its features.

One aspect of the disclosure provides a waveguide antenna assembly. The waveguide antenna assembly includes a lower housing, an upper housing, and a printed circuit board (PCB). The lower housing is formed, at least in part, from a conductive material. The upper housing is coupled to the lower housing and is formed, at least in part, from a conductive material. The upper housing and the lower housing define a slot. The printed circuit board (PCB) is disposed within the slot and includes a first side and a second side. The first side faces the lower housing and includes a first plurality of components arranged in a first circuit. The second side faces the upper housing and includes a second plurality of components arranged in a second circuit.

Another aspect of the disclosure provides a printed circuit board (PCB) assembly. The PCB assembly includes a PCB, a first fin, and a microstrip feed line. The PCB includes a first side and a second side. The first side includes a first plurality of components arranged in a first circuit. The second side opposes the first side and includes a second plurality of components arranged in a second circuit. The first fin is arranged in the first circuit and defines a first long curve and a first short curve. The first fin is disposed on the first side of the PCB. The microstrip feed line is connected to the first fin.

Another aspect of the disclosure provides a printed circuit board (PCB) assembly. The PCB assembly includes a PCB, a first fin, a parasitic fin, and a microstrip feed line. The PCB includes a first side and a second side. The first side includes a first plurality of components arranged in a first circuit. The first fin is arranged in the first circuit and is disposed on the first side of the PCB. The parasitic fin arranged is in the first circuit and is disposed on the first side of the PCB. The microstrip feed line is connected to the first fin.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 13 is a graph showing the results of a simulation of the performance of a PCB-waveguide transition using the first printed circuit board of FIG. 4.

FIG. 14 is a diagram showing the direction of an electric field at various locations on a PCB-waveguide transition using the second printed circuit board of FIG. 7.

In the drawings, reference numbers may be reused to identify similar and/or identical elements.

DETAILED DESCRIPTION

Introduction

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

Waveguide Antenna Assembly

Figure 1:
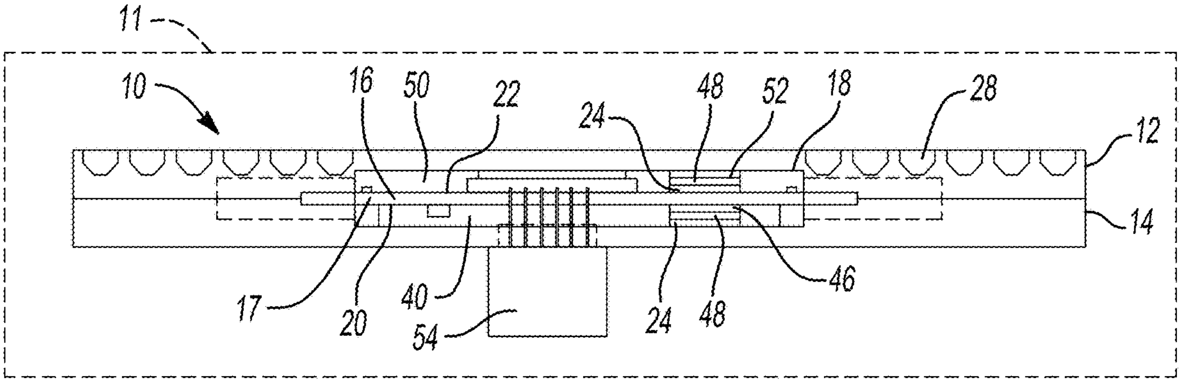
FIG. 1 is a cross-sectional view of a waveguide antenna assembly and housing including a printed circuit board (PCB), PCB-waveguide transition, and waveguide antenna radiating slots according to principles of the present disclosure.

Referring to FIG. 1, a waveguide antenna assembly 10 having a printed circuit board (PCB)-waveguide transition is illustrated. In operation, the waveguide antenna assembly 10 may be coupled to, or otherwise disposed on, a vehicle 11 (e.g., a car, a truck, a sport utility vehicle, etc.) to guide waves (e.g., RF waves) transmitted and/or received by the waveguide antenna assembly 10. The waveguide antenna assembly 10 may include an upper housing 12, a lower housing 14, and a PCB assembly 16. The upper housing 12 may be coupled to the lower housing 14. The upper housing 12 and lower housing 14 may define a slot 18. The PCB assembly 16 may be disposed within the slot 18.

The PCB assembly 16 may include a PCB 17 including a first side 20 and a second side 22. The second side 22 may be opposite the first side 20. The first side 20 may face the lower housing 14. The second side 22 may face the upper housing 12. The first side 20 may include a first plurality of components 24 (e.g., a monolithic microwave integrated circuit, or MMIC) arranged in a first circuit. The second side 22 may include a second plurality of components 24 arranged in a second circuit. In some configurations, the PCB 17 may be a two-layer PCB 17.

Figure 2:
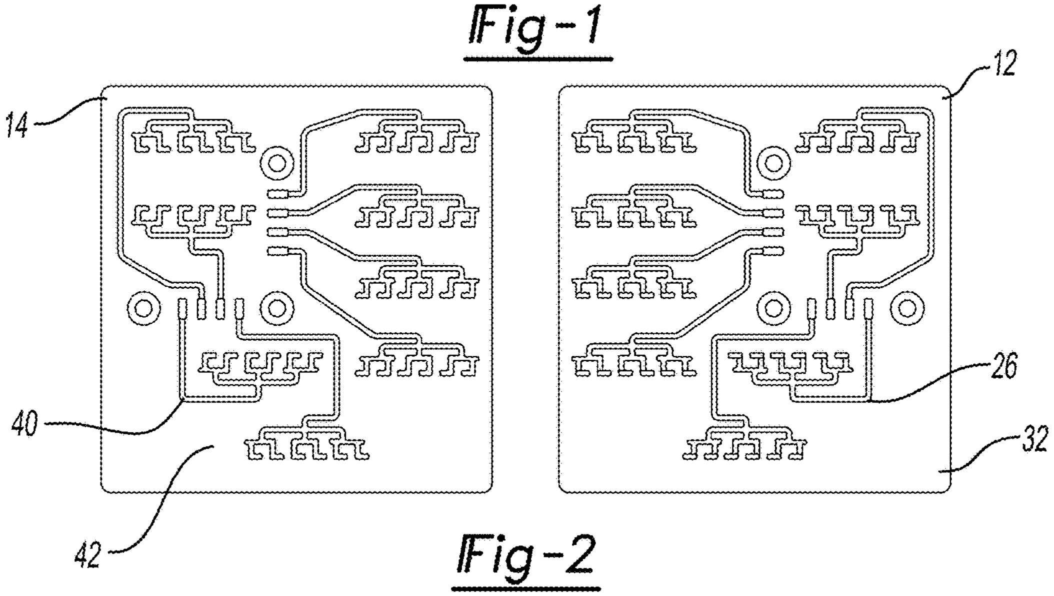
FIG. 2 is a plan view of an inner surface of an upper housing and a lower housing of the waveguide antenna assembly of FIG. 1.
Figure 3:
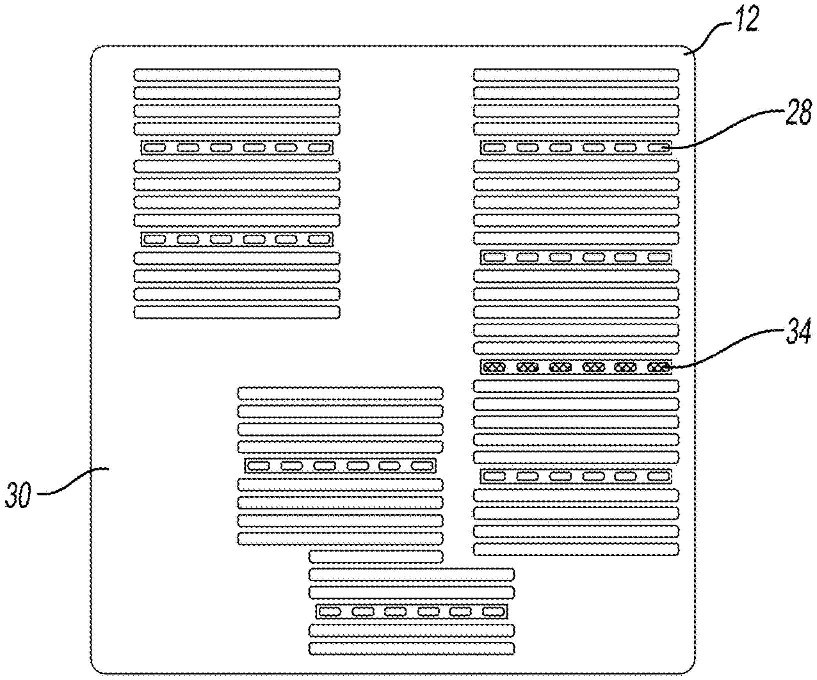
FIG. 3 is a plan view of an outer surface of the upper housing of FIG. 2.

Referring to FIGS. 2 and 3, the upper housing 12 may include one or more waveguide channels 26 and one or more radiator openings 28 in fluid communication with the one or more waveguide channels 26. The one or more radiator openings 28 may be disposed on an outer surface 30 of the upper housing 12. The one or more waveguide channels 26 may be disposed on an inner surface 32 of the upper housing 12. The waveguide channels 26 may guide waves (e.g., RF waves propagated by the PCB assembly 16 or a component 24) out of the radiator openings 28. In some configurations, a dielectric material 34 (e.g., a low loss dielectric material) is disposed within at least one of the radiator openings 28.

The upper housing 12 may be formed from an electrically-conductive and/or thermally-conductive material. For example, in some implementations, the upper housing 12 is formed at least partially out of metal (e.g., steel, aluminum, etc.) and/or an electrically-conductive and/or thermally-conductive plastic (e.g., metalized plastic). In some configurations, the upper housing 12 pulls heat energy away from the PCB assembly 16 to cool the PCB assembly 16 and/or the components 24. For example, the upper housing 12 may act as a heat-sink for the PCB assembly 16 and/or the components 24 to facilitate the transfer of heat from the PCB assembly 16 to the upper housing 12.

In some configurations, the upper housing 12 shields electromagnetic interference (EMI)/radio frequency interference (RFI) to prevent the EMI/RFI from disrupting operation of the PCB assembly 16 and/or the components 24. For example, the upper housing 12 may shield the PCB assembly 16 and/or the components 24 from EMI/RFI. In some configurations, the upper housing 12 defines an opening 36 (FIG. 4) in communication (e.g., fluid communication) with the slot 18. The PCB assembly 16 may be disposed within the opening 36. In some configurations, the slot 18 and the opening 36 are defined at least in part by an upper surface 38 (FIG. 4) of the upper housing 12. The upper surface 38 may be planar.

Referring to FIG. 2, the lower housing 14 may include one or more waveguide channels 40. The waveguide channels 40 may be in fluid communication with the waveguide channels 26 of the upper housing 12. The one or more waveguide channels 40 may be disposed on an inner surface 42 of the lower housing 14. The waveguide channels 40 may guide waves (e.g., RF waves propagated by the PCB assembly 16 or a component 24) to the waveguide channels 26 of the upper housing 12 and out of the radiator openings 28.

The lower housing 14 may be formed from an electrically-conductive and/or thermally-conductive material. For example, in some implementations, the lower housing 14 is formed at least partially out of metal (e.g., steel, aluminum, etc.) and/or an electrically-conductive and/or thermally-conductive plastic (e.g., metalized plastic). In some configurations, the lower housing 14 pulls heat energy away from the PCB assembly 16 to cool the PCB assembly 16 and/or the components 24. For example, the lower housing 14 may act as a heat-sink for the PCB assembly 16 and/or the components 24 to facilitate the transfer of heat from the PCB assembly 16 to the lower housing 14. In some configurations, the lower housing 14 shields electromagnetic interference (EMI)/radio frequency interference (RFI) to prevent the EMI/RFI from disrupting operation of the PCB assembly 16 and the components 24. For example, the lower housing 14 may shield the PCB assembly 16 and/or the components 24 from EMI/RFI. In some configurations, the lower housing 14 reduces EMI/RFI emissions from radar. In some configurations, the lower housing 14 at least partially defines the opening 36.

In some implementations, one or both of the upper housing 12 or the lower housing 14 may function as a radome. In this regard, the waveguide antenna assembly 10 may not include a separate radome.

In some implementations, the upper housing 12 and lower housing 14 may be symmetric or nearly symmetric, which decreases the internal thermal stress on the upper housing 12 and/or lower housing 14 and reduces warpage.

Referring to FIGS. 1, 4, 5, 7, and 8, the lower housing 14 and the first side 20 of the PCB 17 may define a first waveguide channel 44 for a PCB-waveguide transition. The first waveguide channel 44 may be in communication (e.g., fluid communication) with the slot 18 and/or the opening 36. The first waveguide channel 44 may provide EMI shielding for the PCB assembly 16 and/or components 24.

The waveguide antenna assembly 10 may further include a first pedestal 46 disposed within the first waveguide channel 44. The first pedestal 46 may engage the lower housing 14 and at least one component 24 of the first plurality of components 24. The first pedestal 46 may connect the component 24 to the lower housing 14 to provide heat-sinking and facilitate the transfer of heat from the PCB assembly 16 to the lower housing 14. While the waveguide antenna assembly 10 is generally shown and described herein as including one first pedestal 46 engaging the lower housing 14 and at least one component 24 of the first plurality of components 24, it will be appreciated that the waveguide antenna assembly 10 may include a plurality of pedestals 46 each engaging the lower housing 14 and at least one component 24 of the first plurality of components 24 within the scope of the present disclosure. A thermal interface material 48 may be disposed between the first pedestal(s) 46 and the component(s) 24 to further increase the heat-sinking capability of the lower housing 14.

The second side 22 of the PCB 17 and the upper housing 12 may define a cavity 50. The cavity 50 may be in communication (e.g., fluid communication) with the slot 18 and/or the opening 36.

The waveguide antenna assembly 10 may further include a second pedestal 52 disposed within the cavity 50. The second pedestal 52 may engage the upper housing 12 and at least one component 24 of the second plurality of components 24. The second pedestal 52 may connect the component 24 to the upper housing 12 to provide heat-sinking and facilitate the transfer of heat from the PCB assembly 16 to the upper housing 12. While the waveguide antenna assembly 10 is generally shown and described herein as including one second pedestal 52 engaging the upper housing 12 and at least one component 24 of the second plurality of components 24, it will be appreciated that the waveguide antenna assembly 10 may include a plurality of pedestals 52 each engaging the upper housing 12 and at least one component 24 of the second plurality of components 24 within the scope of the present disclosure.

A thermal interface material 48 may be disposed between the second pedestal(s) 52 and the component(s) 24 to further increase the heat-sinking capability of the upper housing 12. The increased heat-sinking capability of the upper housing 12 and the lower housing 14 may increase the radio frequency performance of the waveguide antenna assembly 10 by allowing for more transmit dwell before reaching the thermal limit of the waveguide antenna assembly 10 or PCB assembly 16.

Referring to FIG. 1, the waveguide antenna assembly 10 may include a connector 54 (e.g., an electrical connector). The connector 54 may be coupled to the lower housing 14 and/or the upper housing 12. The connector 54 may be in communication (e.g., electrical communication) with the PCB assembly 16. The connector 54 may connect the PCB assembly 16 to an external electrical system (e.g., an electrical system of the vehicle 11). The connector 54 may provide power to the PCB assembly 16. In some configurations, the connector 54 is sealed from the external environment.

PCB Assembly

Referring to FIGS. 4-8, 9A, and 9B, in addition to the PCB 17, the PCB assembly 16 may include one or more Vivaldi antenna fins 56-1, 56-2, a microstrip feed line 58, and one or more via fences 60. A first Vivaldi fin 56-1 may be disposed on the first side 20 of the PCB 17 and a second Vivaldi fin 56-2 may be disposed on the second side 22 of the PCB 17. The one or more via fences 60 may connect the PCB assembly 16 and/or the PCB 17 to the upper housing 12 or the lower housing 14. Specifically, the one or more via fences 60 may electrically connect the one or more Vivaldi fins 56-1, 56-2 to the upper housing 12 or the lower housing 14. The microstrip feed line 58 may be disposed on the first side 20 of the PCB 17 and connected (e.g., electrically connected) to the first Vivaldi fin 56-1. Additionally, the one or more via fences 60 may connect (e.g., electrically connect) the upper housing 12 to the lower housing 14.

The first Vivaldi fin 56-1 may make at least partial contact with the inner surface 42 of the lower housing 14, and the second Vivaldi fin 56-2 may make at least partial contact with the inner surface 32 of the upper housing 12.

The first Vivaldi fin 56-1 may include a first side 62-1 defined by a long curve 64-1 and a second side 66-1 defined by a short curve 68-1. The first side 62-1 may be adjacent to the second side 66-1. The long curve 64-1 may be defined by a first exponential function $y=a\cdot b^x$, where "a" is a first constant, "b" is a second constant, and "x" is a variable value. The short curve 68-1 may be defined by a second exponential function $y=c\cdot d^x$, where "c" is a third constant, "d" is a fourth constant, and "x" is a variable value. The first exponential function and the second exponential function may be different exponential functions. For example, if "a" is equal to "c," then "b" is not equal to "d," or vice versa. The first Vivaldi fin 56-1 may match the second Vivaldi fin 56-2. Specifically, the second Vivaldi fin 56-2 may include a second long curve 64-2 and a second short curve 68-2. The first long curve 64-1 may match the second long curve 64-2. For example, the first long curve 64-1 may include the same size and/or shape as the second long curve 64-2. The first short curve 68-1 may match the second short curve 68-2. For example, the first short curve 68-1 may include the same size and/or shape as the second short curve 68-2. The long curves 64-1, 64-2 and the short curves 68-1, 68-2 may at least partially define the shape of the Vivaldi fins 56-1, 56-2. The shape of the Vivaldi fins 56-1, 56-2 may determine the resonant frequency, impedance matching, and bandwidth of the waveguide antenna assembly 10.

Figure 12:
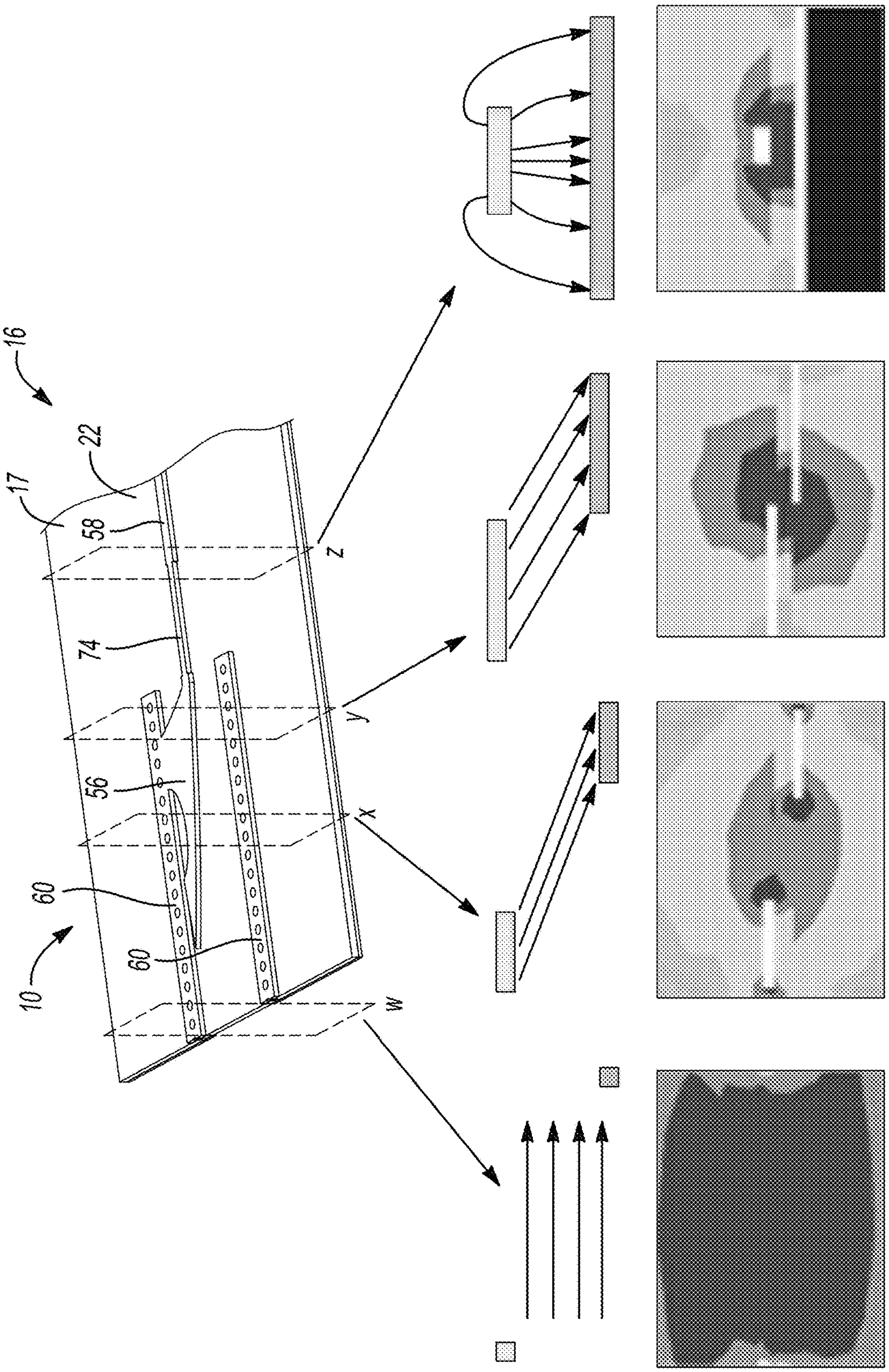
FIG. 12 is a diagram showing the direction of an electric field at various locations on a PCB-waveguide transition using the first printed circuit board of FIG. 4.

The Vivaldi fins 56-1, 56-2 may act as a field (e.g., electromagnetic field) converter. For example, the Vivaldi fins 56-1, 56-2 may rotate fields (e.g., electric fields) carried by the microstrip feed line 58 (e.g., Transverse Electromagnetic (TEM) mode) and then gradually flare out the electric fields along the Vivaldi fins 56-1, 56-2 to match the fundamental mode (e.g., Transverse Electric 10 ($TE_{10}$) mode) of the waveguide antenna assembly 10. FIG. 12 shows the change of the electric fields at four plane cuts w, x, y, z during the mode conversion process using the PCB assembly 16. The simulation results of FIG. 13 show matching at both the microstrip feed line 58 and waveguide ports (denoted as "w" in FIG. 12), indicating a successful mode conversion process.

In some configurations, the PCB assembly 16 includes a matching section 74 disposed between and connecting the Vivaldi fin 56-1, 56-2 and the microstrip feed line 58. The matching section 74 may be wider or narrower than the microstrip feed line 58 depending on material properties, shape of the Vivaldi fins 56-1, 56-2, and/or size of the waveguide antenna assembly 10.

Figure 4:
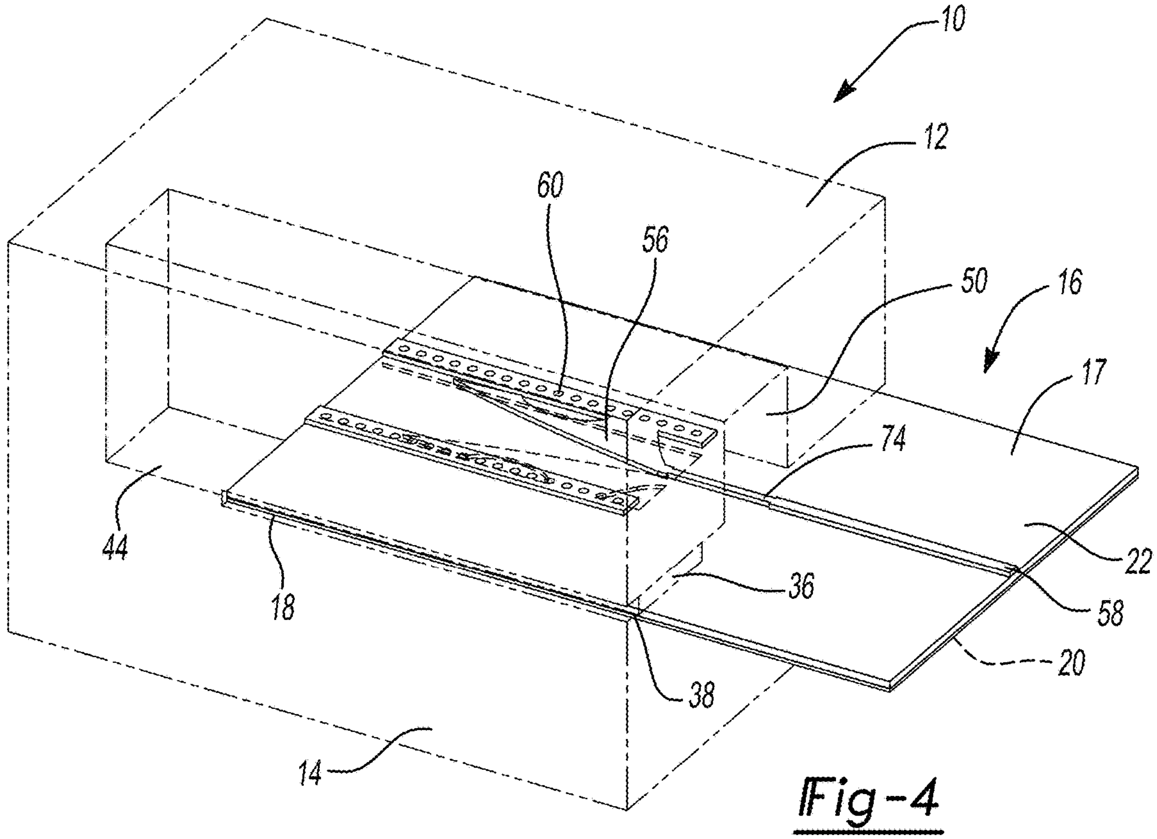
FIG. 4 is a perspective view of a PCB-waveguide transition of the waveguide antenna assembly of FIG. 1 including a first printed circuit board and a waveguide channel according to principles of the present disclosure.
Figure 5:
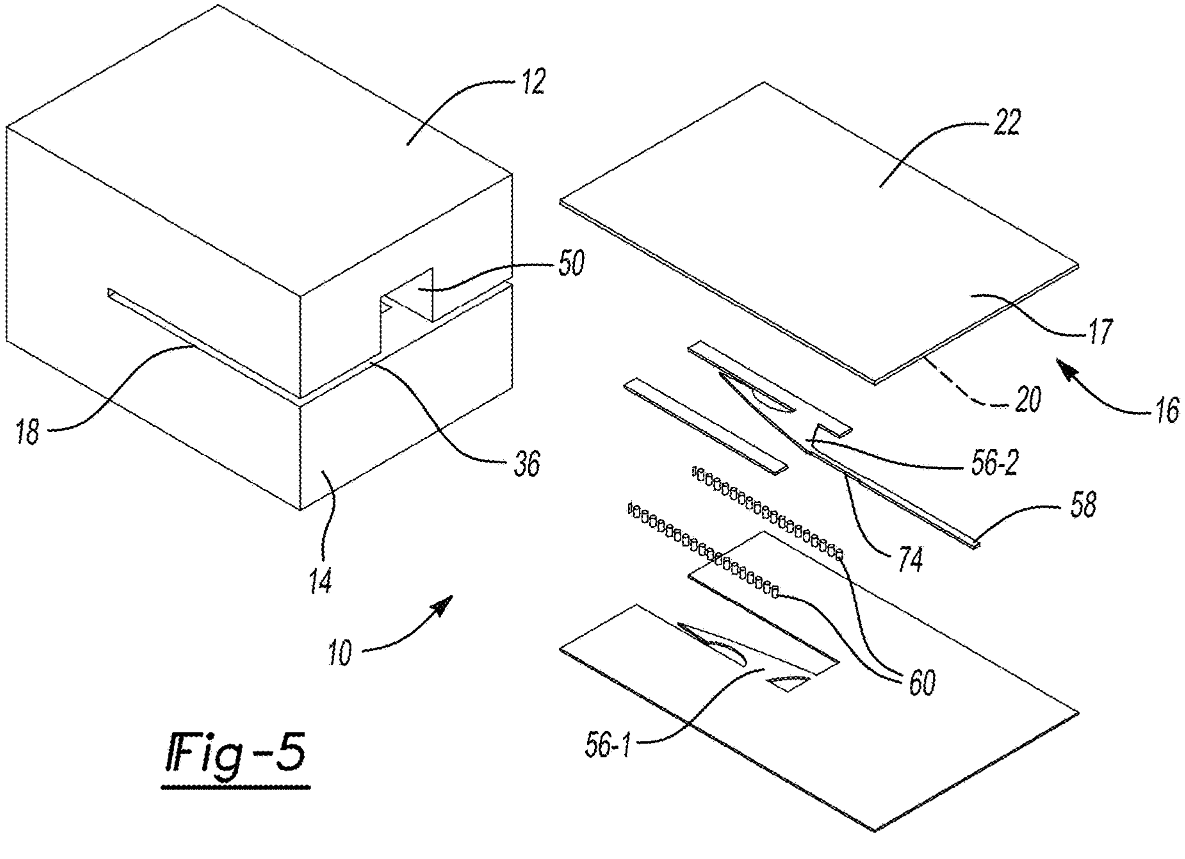
FIG. 5 is an exploded view of the PCB-waveguide transition of FIG. 4.
Figure 6:
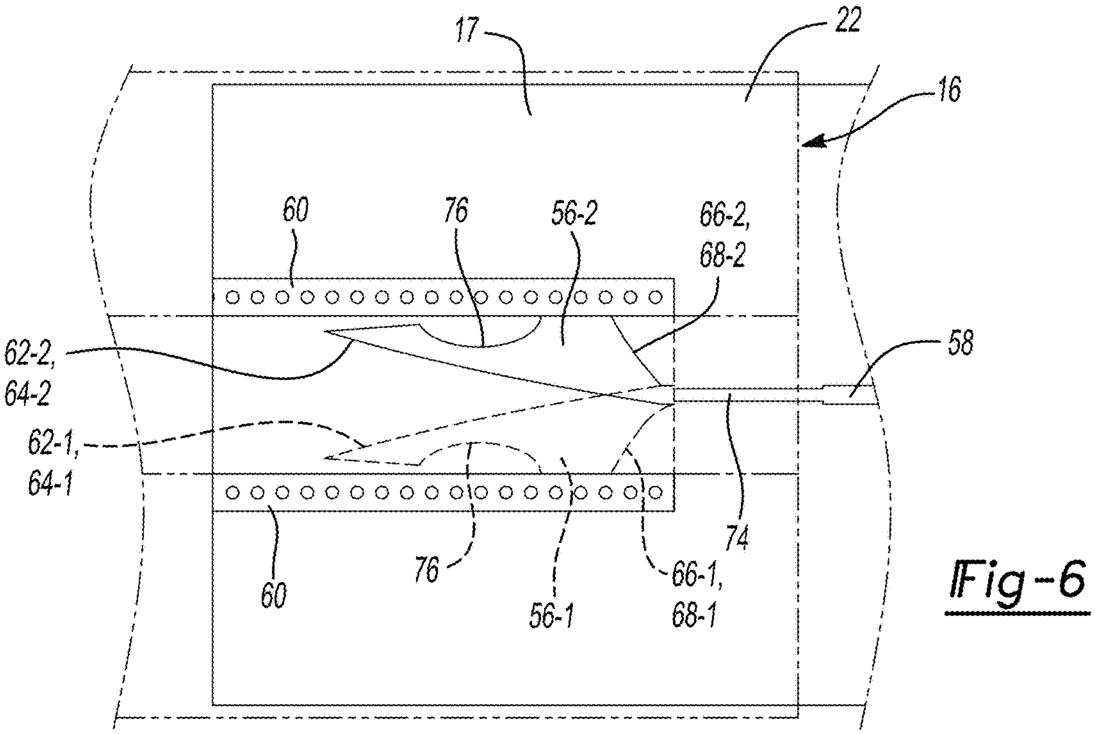
FIG. 6 is a plan view of the first printed circuit board of FIG. 4.
Figure 7:
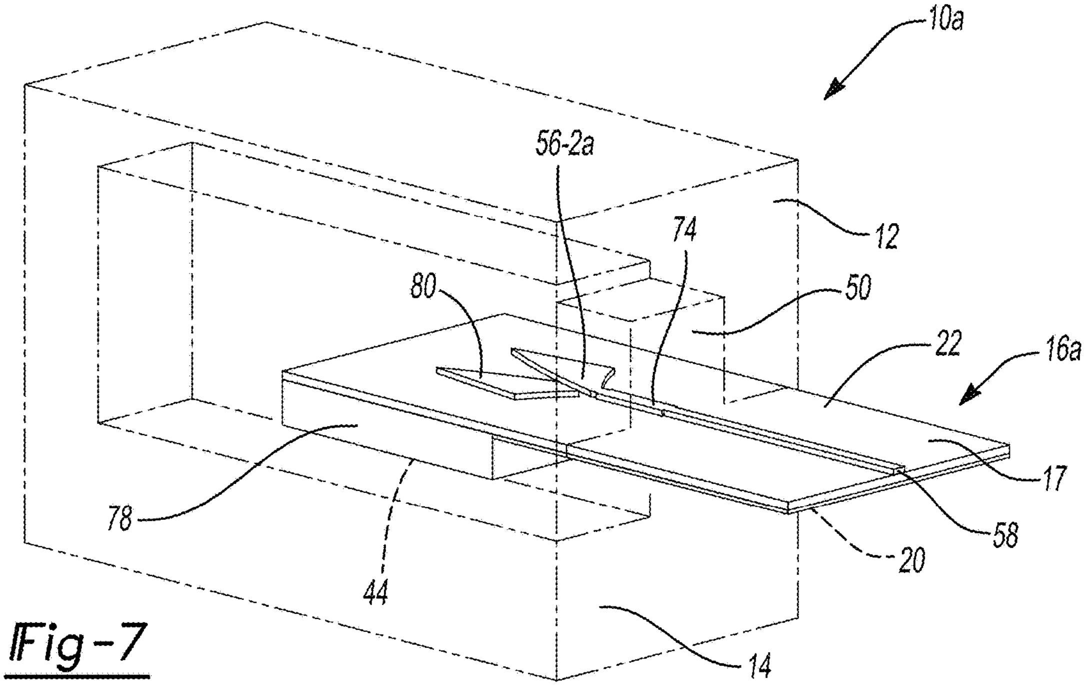
FIG. 7 is a perspective view of another PCB-waveguide transition including a second printed circuit board substrate according to principles of the present disclosure.
Figure 8:
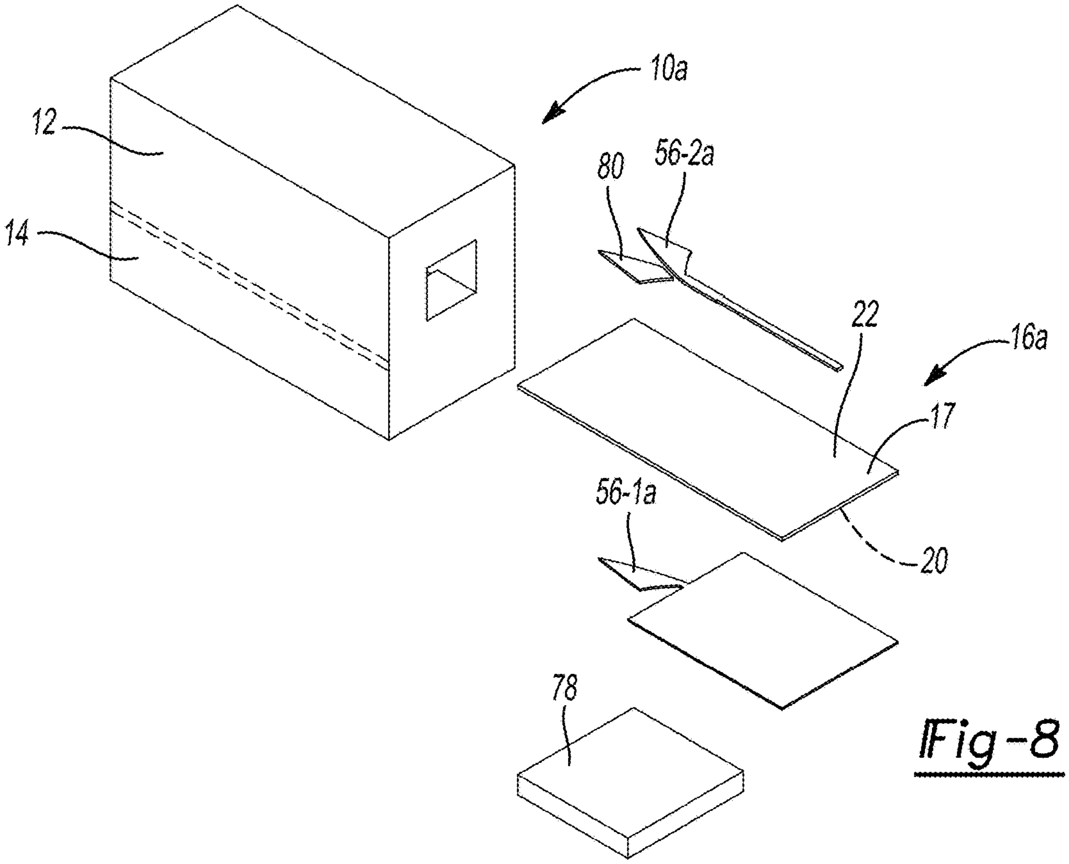
FIG. 8 is an exploded view of the second printed circuit board of FIG. 7.
Figure 9A:
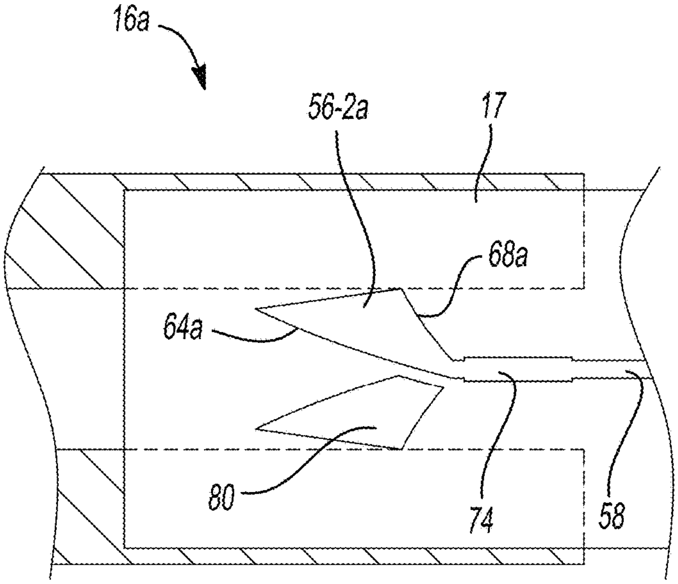
FIGS. 9A and 9B are a top and bottom view of the second printed circuit board of FIG. 7, respectively.
Figure 9B:
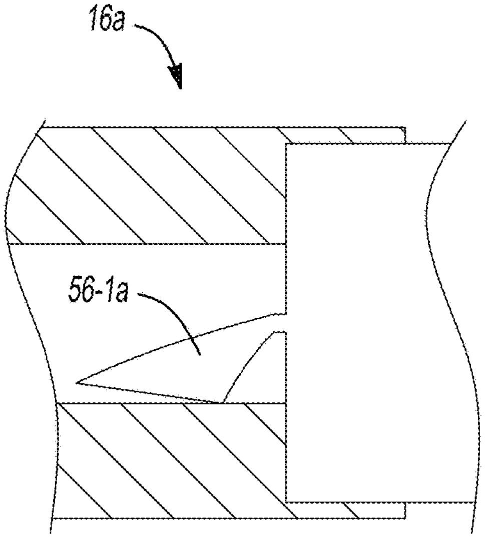

Referring to FIGS. 4-6, in a first exemplary design of the PCB assembly 16, the PCB assembly 16 may include a thin substrate PCB 17. In some configurations, the thin substrate PCB 17 is approximately 83 micrometers thick. The Vivaldi fins 56-1, 56-2 may include a matching arch 76. The matching arch 76 may enhance the bandwidth matching of the waveguide antenna assembly 10.

Referring to FIGS. 7,8, 9A, and 9B, a waveguide antenna assembly **10*a* may include the upper housing 12, the lower housing 14, and a PCB assembly 16*a*. In view of the substantial similarity in structure and function of the components associated with the waveguide antenna assembly 10*a* with respect to the waveguide antenna assembly 10, like reference numerals are used hereinafter and in the drawings to identify like components while like reference numerals containing letter extensions (e.g., "a") are used to identify those components that have been modified. The PCB assembly 16***a* may be a thick substrate PCB assembly 16*a*. The thick substrate may be thicker than the thin substrate of the PCB assembly 16. A thick substrate may be used due to ease or cost to manufacture.

Figure 15:
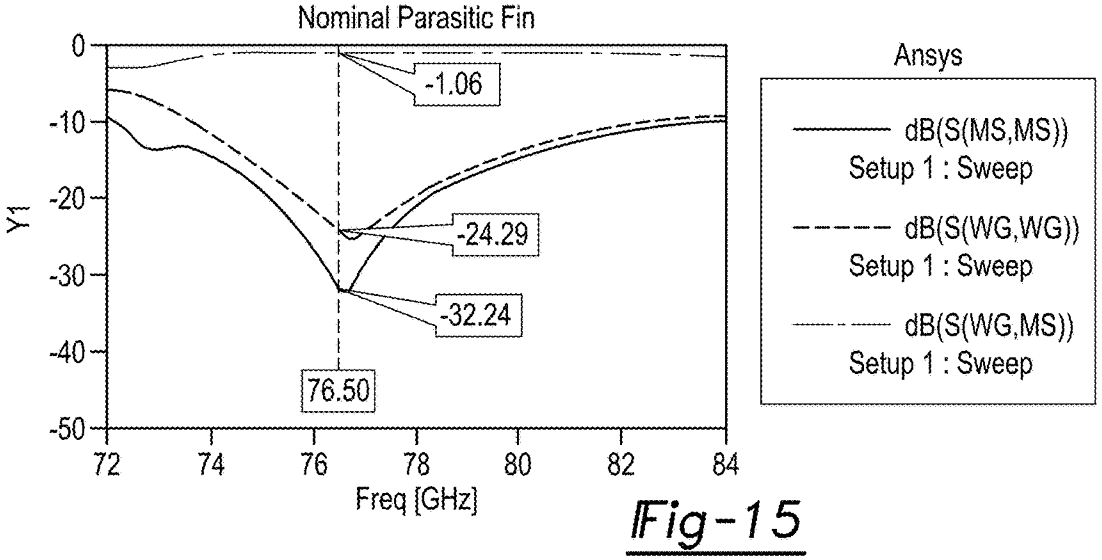
FIG. 15 is a graph showing the results of a simulation of the performance of a PCB-waveguide transition using the second printed circuit board of FIG. 7.
Figure 16A:
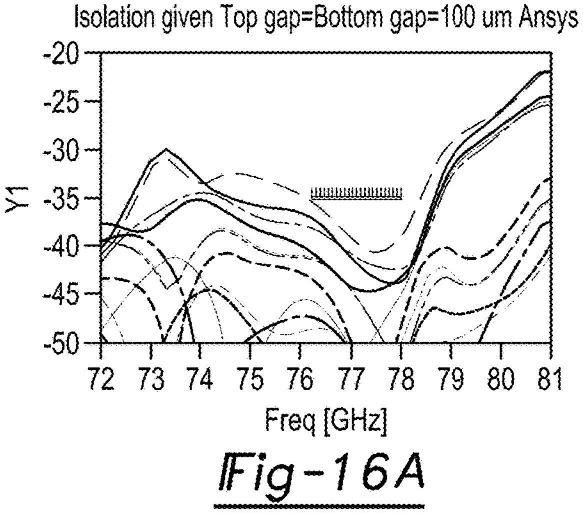
FIGS. 16A-D are graphs showing a simulated isolation performance of the array of PCB-waveguide transitions of FIG. 10.
Figure 16B:
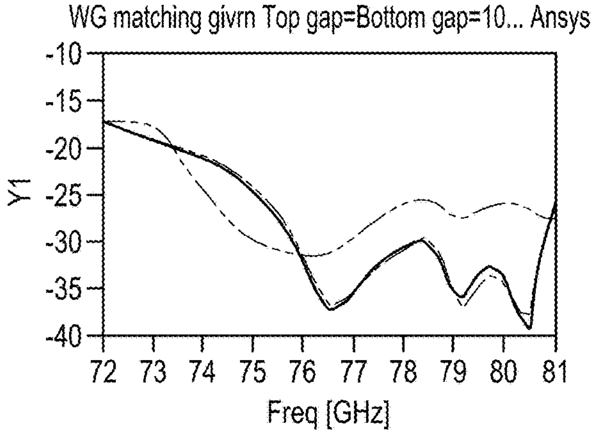
Figure 16C:
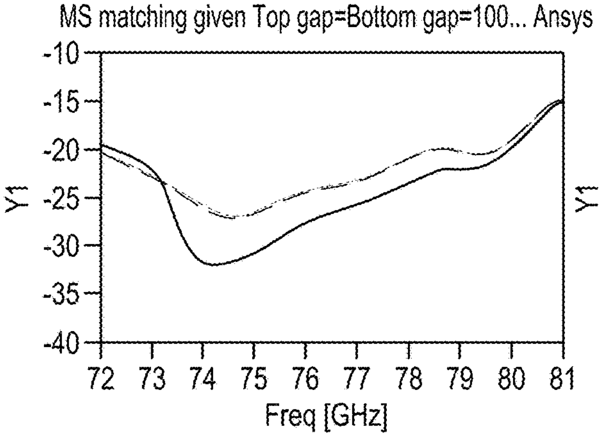
Figure 16D:
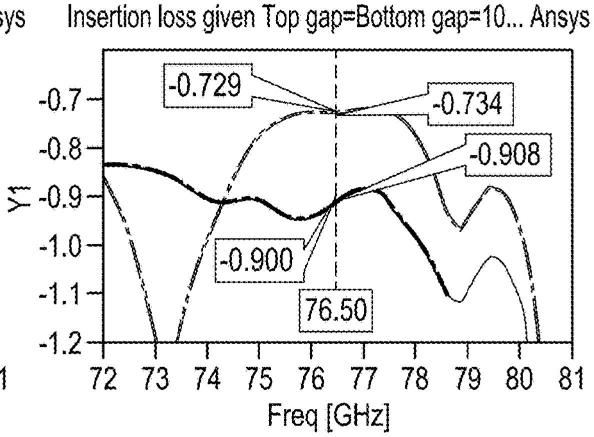

The thick substrate PCB assembly 16*a* may include an additional layer 78 (e.g., a PCB having a thickness greater than the thickness of the PCB 17) and a parasitic fin 80. In some configurations, the additional layer is approximately 452 micrometers thick. In some configurations, the additional layer 78 is composed of multiple layers of dielectric materials with various layer thickness and material properties (e.g., dielectric constant (Dk) and loss tangent (tan D)). The parasitic fin 80 may be disposed on a second side 22*a* of the PCB assembly 16*a*. The parasitic fin 80 may be disposed near the second Vivaldi fin 56-2*a*. In some configurations, there is a gap of approximately 0.1 millimeters between the parasitic fin 80 and the second Vivaldi fin 56-2*a*. In this configuration, the Vivaldi fins 56-1*a*, 56-2*a* may not include the matching arch 76. In this configuration, the long curve 64*a* and the short curve 68*a* of the second Vivaldi fin 56-2*a* may be tuned (e.g., shaped) for impedance matching. The additional layer 78 may affect (e.g., attract) the electric fields. The parasitic fin 80 may counteract the effect of the additional layer 78 on the electric fields. FIG. 14 shows the change of the electric fields at six plane cuts a, b, c, d, e, f during the mode conversion process using the PCB assembly 16*a*. FIG. 15 shows simulation results of the performance of the thick PCB assembly 16*a* including the parasitic fin 80.

Figure 10:
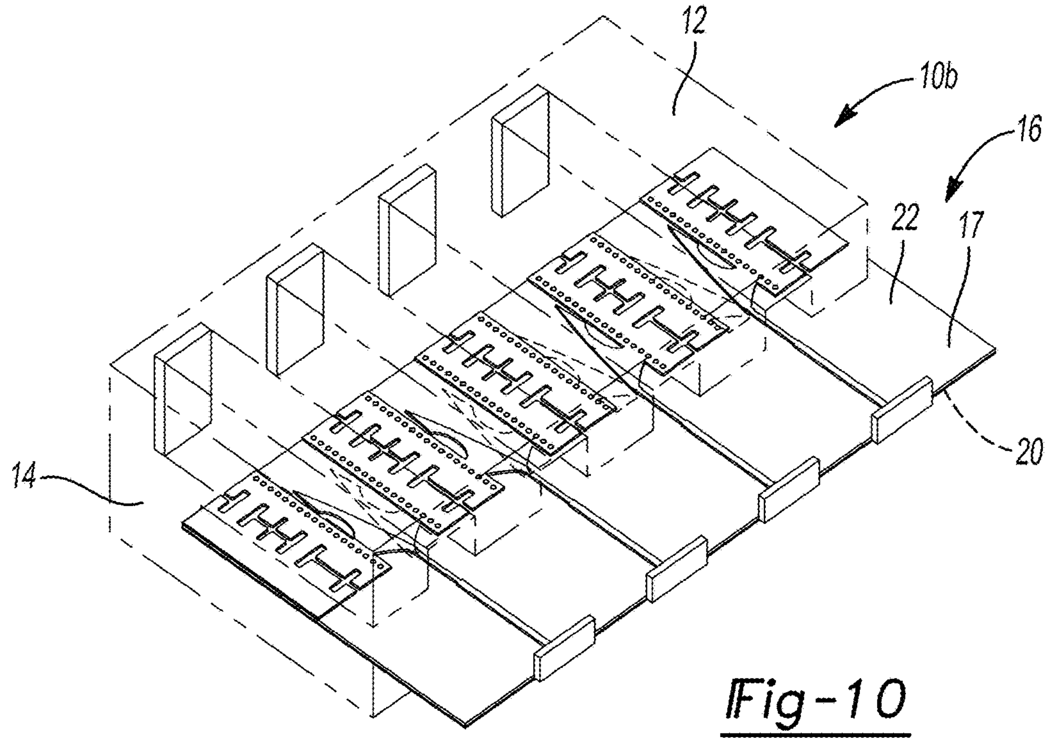
FIG. 10 is a perspective view of an array of PCB-waveguide transitions according to principles of the present disclosure.
Figure 11:
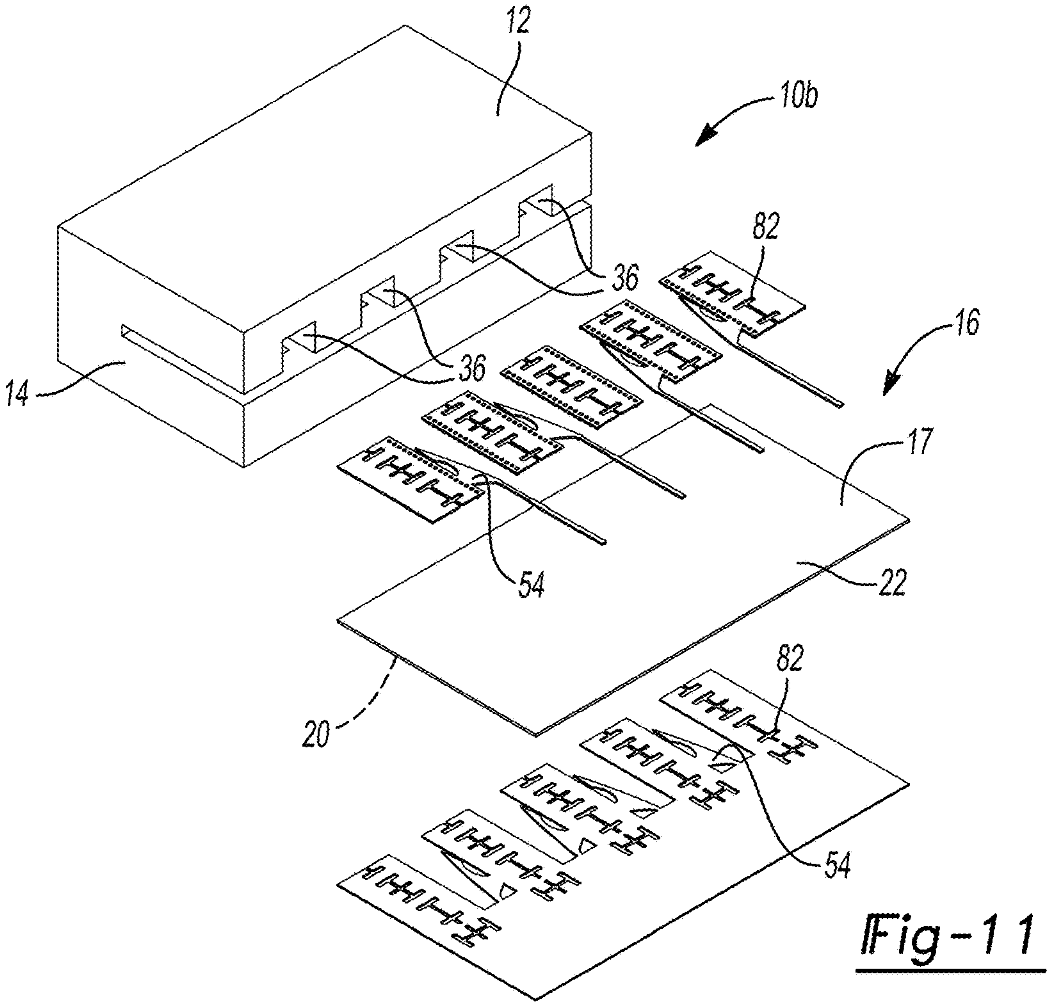
FIG. 11 is an exploded view of the waveguide antenna assembly FIG. 10.

Referring to FIGS. 10 and 11, a waveguide antenna assembly 10*b* may include the upper housing 12, the lower housing 14, and one or more PCB assemblies (e.g., PCB assembly 16 and/or PCB assembly 16*a*). In view of the substantial similarity in structure and function of the components associated with the waveguide antenna assembly 10*b* with respect to the waveguide antenna assembly 10, like reference numerals are used hereinafter and in the drawings to identify like components while like reference numerals containing letter extensions (e.g., "b") are used to identify those components that have been modified. In some configurations, the waveguide antenna assembly 10*b* may include a plurality of PCB assemblies (e.g., PCB assembly 16 and/or PCB assembly 16*a*) arranged in an array (e.g., straight or staggered). In this configuration, the upper housing 12 or the lower housing 14 includes multiple openings 36 and each PCB assembly is disposed within an opening 36. Energy may leak from one opening 36 to another opening 36 reducing the performance of the waveguide antenna assembly 10*b*. An isolation slot 82 may be placed on one or both of the first side 20 and second side 22 of each PCB assembly. The isolation slots 82 may prevent energy from leaking from one opening 36 to another opening 36, thereby improving performance of the waveguide antenna assembly. FIGS. 16A-D show the simulated performance of the waveguide antenna assembly 10*b* using the isolation slots 82.

The following Clauses provide an exemplary configuration for a waveguide antenna and housing, as described above.

Clause 1: A waveguide antenna assembly comprising: a lower housing formed at least in part from a conductive material; an upper housing coupled to the lower housing and formed at least in part from a conductive material, the upper housing and the lower housing defining a slot; and a printed circuit board (PCB) disposed within the slot and including a first side and a second side, the first side facing the lower housing and including a first plurality of components arranged in a first circuit, the second side facing the upper housing and including a second plurality of components arranged in a second circuit.

Clause 2: The waveguide antenna assembly of clause 1, wherein the upper housing and the lower housing are configured to provide heat-sinking to the PCB.

Clause 3: The waveguide antenna assembly of any of clauses 1 through 2, wherein the upper housing and the lower housing are configured to provide shielding to the PCB.

Clause 4: The waveguide antenna assembly of any of clauses 1 through 3, wherein at least one of the lower housing or the upper housing defines an opening in communication with the slot, and wherein the PCB is disposed within the opening.

Clause 5: The waveguide antenna assembly of clause 4, wherein the slot and the opening are defined at least in part by an upper surface of the upper housing, and wherein the upper surface is planar.

Clause 6: The waveguide antenna assembly of any of clauses 1 through 5, wherein the waveguide antenna assembly does not include a radome.

Clause 7: The waveguide antenna assembly of any of clauses 1 through 6, wherein the first side and the lower housing define a first waveguide channel in communication with the slot.

Clause 8: The waveguide antenna assembly of clause 7, further comprising a first pedestal disposed within the first waveguide channel and engaging the lower housing and at least one component of the first plurality of components.

Clause 9: The waveguide antenna assembly of clause 8, further comprising a thermal interface material disposed between the first pedestal and the at least one component of the first plurality of components.

Clause 10: The waveguide antenna assembly of any of clauses 1 through 9, wherein the second side and the upper housing define a cavity in communication with the slot.

Clause 11: The waveguide antenna assembly of clause 10, further comprising a second pedestal disposed within the cavity and engaging the upper housing and at least one component of the second plurality of components.

Clause 12: The waveguide antenna assembly of clause 11, further comprising a first pedestal disposed within a first waveguide channel and engaging the lower housing and at least one component of the first plurality of components.

Clause 13: The waveguide antenna assembly of clause 11, further comprising a thermal interface material disposed between the second pedestal and the at least one component of the second plurality of components.

Clause 14: The waveguide antenna assembly of any of clauses 1 through 13, wherein the upper housing includes at least one radiator opening.

Clause 15: The waveguide antenna assembly of clause 14, further comprising a dielectric material disposed within the at least one radiator opening.

Clause 16: The waveguide antenna assembly of clause 14, wherein the upper housing includes a waveguide channel in fluid communication with the at least one radiator opening.

Clause 17: The waveguide antenna assembly of clause 16, wherein the at least one radiator opening is disposed on an outer surface of the upper housing.

Clause 18: The waveguide antenna assembly of any of clauses 1 through 17, further comprising a connector coupled to the lower housing and in communication with the PCB.

Clause 19: The waveguide antenna assembly of any of clauses 1 through 18, wherein at least one of the upper housing or the lower housing replaces a radome.

Clause 20: A vehicle comprising the waveguide antenna assembly of any of clauses 1 through 19.

Clause 21: A printed circuit board (PCB) assembly comprising: a PCB including a first side and a second side, the first side including a first plurality of components arranged in a first circuit, the second side opposing the first side and including a second plurality of components arranged in a second circuit; a first fin arranged in the first circuit and defining a first long curve and a first short curve and disposed on the first side of the PCB; and a microstrip feed line connected to the first fin.

Clause 22: The PCB assembly of clause 21, wherein: the first long curve is defined by a first exponential function; and the first short curve is defined by a second exponential function different than the first exponential function.

Clause 23: The PCB assembly of any of clauses 21 through 22, further comprising a second fin arranged in the second circuit and defining a second long curve and a second short curve and disposed on the second side of the PCB.

Clause 24: The PCB assembly of clause 23, wherein: the second long curve matches the first long curve; and the second short curve matches the first short curve.

Clause 25: The PCB assembly of any of clauses 21 through 24, further comprising a via fence connecting the first fin to an upper housing or a lower housing of a waveguide antenna assembly.

Clause 26: The PCB assembly of clause 25, wherein the first fin engages the via fence.

Clause 27: The PCB assembly of any of clauses 21 through 26, further comprising a matching section disposed between the first fin and the microstrip feed line.

Clause 28: The PCB assembly of any of clauses 21 through 27, further comprising a parasitic fin disposed on the second side of the PCB.

Clause 29: The PCB assembly of any of clauses 21 through 28, further comprising an arch portion extending between the first long curve and the first short curve.

Clause 30: The PCB assembly of any of clauses 21 through 29, further comprising a matching section extending from the first fin and having a first width, wherein the microstrip feed line has a second width different than the first width.

Clause 31: The PCB assembly of clause 30, wherein the matching section is disposed between the first fin and the microstrip feed line, and wherein the first width is less than the second width.

Clause 32: A printed circuit board (PCB) assembly comprising: a PCB including a first side and a second side, the first side including a first plurality of components arranged in a first circuit; a first fin arranged in the first circuit and disposed on the first side of the PCB; a parasitic fin arranged in the first circuit and disposed on the first side of the PCB; and a microstrip feed line connected to the first fin.

Clause 33: The PCB assembly of clause 32, further comprising an additional PCB coupled to the second side of the PCB.

Clause 34: The PCB assembly of any of clauses 32 through 33, further comprising a parasitic fin disposed on the first side of the PCB.

Clause 35: The PCB assembly of clause 34, wherein the parasitic fin is spaced apart from the first fin.

Clause 36: The PCB assembly of any of clauses 32 through 35, further comprising a matching section extending from the first fin and having a first width, wherein the microstrip feed line has a second width different than the first width.

Clause 37: The PCB assembly of clause 36, wherein the matching section is disposed between the first fin and the microstrip feed line, and wherein the first width is greater than the second width.

Clause 38: The PCB assembly of clause 36, wherein the second side opposes the first side and includes a second plurality of components arranged in a second circuit.

Clause 39: The PCB assembly of clause 38, further comprising a second fin arranged in the second circuit.

Clause 40: The PCB assembly of any of clauses 32 through 39, wherein the first fin defines a first long curve and a first short curve.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in a different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

Spatial and functional relationships between elements (for example, between modules, circuit elements, semiconductor layers, etc.) are described using various terms, including "connected," "engaged," "coupled," "adjacent," "proximate," "next to," "on top of," "above," "below," and "disposed." Unless explicitly described as being "direct," when a relationship between first and second elements is described in the above disclosure, that relationship encompasses a direct relationship where no other intervening elements are present between the first and second elements as well as an indirect relationship where one or more intervening elements are present between the first and second elements. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "set" does not necessarily exclude the empty set—in other words, in some circumstances a "set" may have zero elements. The term "non-empty set" may be used to indicate exclusion of the empty set—in other words, a non-empty set will always have one or more elements. The term "subset" does not necessarily require a proper subset. In other words, a "subset" of a first set may be coextensive with (equal to) the first set. Further, the term "subset" does not necessarily exclude the empty set—in some circumstances a "subset" may have zero elements.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. A waveguide antenna assembly comprising:
- a lower housing formed at least in part from a conductive material;
- an upper housing coupled to the lower housing and formed at least in part from a conductive material, the upper housing and the lower housing defining a slot;
- a printed circuit board (PCB) disposed within the slot and including a first side and a second side, the first side facing the lower housing and including a first plurality of components arranged in a first circuit, the second side facing the upper housing and including a second plurality of components arranged in a second circuit, the first side and the lower housing defining a first waveguide channel in communication with the slot; and
- a first pedestal disposed within the first waveguide channel and engaging the lower housing and at least one component of the first plurality of components.

2. The waveguide antenna assembly of claim 1, wherein the upper housing and the lower housing are configured to provide heat-sinking to the PCB.

3. The waveguide antenna assembly of claim 1, wherein the upper housing and the lower housing are configured to provide shielding to the PCB.

4. The waveguide antenna assembly of claim 1, wherein at least one of the lower housing or the upper housing defines an opening in communication with the slot, and wherein the PCB is disposed within the opening.

5. The waveguide antenna assembly of claim 4, wherein the slot and the opening are defined at least in part by an upper surface of the upper housing, and wherein the upper surface is planar.

6. The waveguide antenna assembly of claim 1, wherein the waveguide antenna assembly does not include a radome.

7. The waveguide antenna assembly of claim 1, further comprising a thermal interface material disposed between the first pedestal and the at least one component of the first plurality of components.

8. The waveguide antenna assembly of claim 1, wherein the upper housing includes at least one radiator opening.

9. The waveguide antenna assembly of claim 8, further comprising a dielectric material disposed within the at least one radiator opening.

10. The waveguide antenna assembly of claim 8, wherein the upper housing includes a waveguide channel in fluid communication with the at least one radiator opening.

11. The waveguide antenna assembly of claim 1, further comprising a connector coupled to the lower housing and in communication with the PCB.

12. The waveguide antenna assembly of claim 1, wherein at least one of the upper housing or the lower housing replaces a radome.

13. A vehicle comprising the waveguide antenna assembly of claim 1.

14. A waveguide antenna assembly comprising:
- a lower housing formed at least in part from a conductive material;
- an upper housing coupled to the lower housing and formed at least in part from a conductive material, the upper housing and the lower housing defining a slot;
- a printed circuit board (PCB) disposed within the slot and including a first side and a second side, the first side facing the lower housing and including a first plurality of components arranged in a first circuit, the second side facing the upper housing and including a second plurality of components arranged in a second circuit, the second side and the upper housing defining a cavity in communication with the slot; and
- a second pedestal disposed within the cavity and engaging the upper housing and at least one component of the second plurality of components.

15. The waveguide antenna assembly of claim 14, further comprising a first pedestal disposed within a first waveguide channel and engaging the lower housing and at least one component of the first plurality of components.

16. The waveguide antenna assembly of claim 14, further comprising a thermal interface material disposed between the second pedestal and the at least one component of the second plurality of components.

17. A waveguide antenna assembly comprising:
- a lower housing formed at least in part from a conductive material;
- an upper housing coupled to the lower housing and formed at least in part from a conductive material, the upper housing and the lower housing defining a slot, the upper housing including (i) at least one radiator opening disposed on an outer surface of the upper housing and (ii) a waveguide channel in fluid communication with the at least one radiator opening; and
- a printed circuit board (PCB) disposed within the slot and including a first side and a second side, the first side facing the lower housing and including a first plurality of components arranged in a first circuit, the second side facing the upper housing and including a second plurality of components arranged in a second circuit.

* * * * *